United States Patent [19]

Ogawa et al.

[11] Patent Number: 4,481,995

[45] Date of Patent: Nov. 13, 1984

[54] PNEUMATIC RADIAL TIRES

[75] Inventors: Masaki Ogawa; Yasushi Hirata; Tatsuo Fujimaki; Tomoharu Yamada, all of Tokyo; Seisuke Tomita, Saitama, all of Japan

[73] Assignee: Bridgestone Tire Co., Ltd., Tokyo, Japan

[21] Appl. No.: 417,943

[22] Filed: Sep. 14, 1982

[30] Foreign Application Priority Data

Sep. 14, 1981 [JP] Japan .................. 56-143994

[51] Int. Cl.³ ................... B60C 13/00; B60C 9/02
[52] U.S. Cl. .................. 152/356 R; 152/354 R; 152/374; 524/526; 525/237
[58] Field of Search ........... 152/330 R, 353 R, 354 R, 152/355, 356 R, 374, 353 C; 525/237; 524/526

[56] References Cited

U.S. PATENT DOCUMENTS

| 2,186,178 | 1/1940 | Shoemaker | 152/356 X |
| 2,493,614 | 1/1950 | Bourdon | 152/357 X |
| 2,948,320 | 8/1960 | Ford | 152/330 R |
| 3,205,214 | 9/1965 | Talcott | 152/330 R X |
| 3,972,862 | 8/1976 | Tornqvist et al. | 526/122 |

FOREIGN PATENT DOCUMENTS 1042141 11/1978 Canada .

Primary Examiner—William A. Powell
Assistant Examiner—Thomas Bokan
Attorney, Agent, or Firm—Sughrue, Mion, Zinn, Macpeak & Seas

[57] ABSTRACT

A pneumatic radial tire having sidewalls, the rubber composition of said sidewalls comprising, based on 100 parts by weight of rubber, 20 to 90 parts by weight of butadienepiperylene copolymer and 80 to 10 parts by weight of at least one rubbery diene polymer selected from the group consisting of natural rubber, synthetic polyisoprene rubber, polybutadiene rubber, butadiene-styrene copolymer rubber, ethylenepropylene-diene ternary copolymer rubber and acrylonitrile-butadiene copolymer rubber.

5 Claims, 2 Drawing Figures

PNEUMATIC RADIAL TIRES

FIELD OF THE INVENTION

The present invention relates to pneumatic tires, and more particularly to pneumatic radial tires which can improve ride feeling by using a rubber composition which has a high flex resistance and produces an excellent damping effect in the sidewalls.

BACKGROUND OF THE INVENTION

Recently, resource and energy savings have been socially demanded. As a result, the development of so-called low fuel consumption tires has been eagerly carried out to reduce power loss. For this purpose, not only have tire structures been modified and the weight of tires been reduced, but also, almost all of the rubber compositions in all of the parts of the tire have been replaced with those yielding a lower energy loss. However, utilization of lower energy loss rubber compositions in all of the parts of the tire has resulted in very poor ride feeling of the tire.

Based upon consideration of the above-mentioned result and on the highly-advanced technology of lower energy consumption, it has been proposed to prepare a rubber composition having high energy loss in the sidewalls which will bring about an improvement in ride feeling. Such a composition having high energy loss can be prepared, for example, by (1) an increased addition of regular carbon black, (2) use of higher-quality carbon black or (3) an increased addition of softener. However, each of these approaches has unavoidable drawbacks.

An increased addition of regular carbon black means an increase in the modulus of elasticity of the rubber composition. Not only is it impossible by this means to improve the ride feeling but it also unfavorably lowers the flex resistance.

The use of higher-quality carbon black increases the storage modulus of elasticity E' of the rubber composition and this is not desirable from the standpoint of cut growth which starts from a small incision on the sidewall.

An increased addition of softener greatly lowers the weather resistance of the composition.

SUMMARY OF THE INVENTION

A principal object of this invention is to provide a pneumatic radial tire which can improve the ride feeling by using an improved rubber composition possessing high energy loss in the sidewalls.

More particularly, this invention relates to a pneumatic radial tire having sidewalls, the vulcanizable rubber composition of which comprises, based on 100 parts by weight of rubber, 20 to 90 parts by weight of butadiene-piperylene copolymer and 80 to 10 parts by weight of at least one rubbery diene polymer selected from the group consisting of natural rubber, synthetic polyisoprene rubber, polybutadiene rubber, butadiene-styrene copolymer rubber, ethylene-propylene-diene ternary copolymer rubber and acrylonitrile-butadiene copolymer rubber. The vulcanizable rubber composition comprises 20 to 120 parts by weight of carbon black in the same manner as a usual rubber composition.

DETAILED DESCRIPTION OF THE INVENTION

The butadiene-piperylene copolymers according to the present invention can be prepared by known methods (see U.S. Pat. No. 3,972,862; Canadian Pat. No. 1,042,141).

The average molecular weight of the copolymers varies between about 150,000 and 500,000. The amount of the butadiene-piperylene copolymer is limited to 20 to 90 parts by weight based on 100 parts by weight of rubber in the rubber composition according to the present invention because the sidewall in the tire of this invention cannot improve the damping effect when the amount is less than 20 parts by weight and, because sidewall cut resistance is lost when the amount is more than 90 parts by weight. The butadiene-piperylene copolymer is selected because polybutadiene rubber has excellent flex resistance but low tensile strength.

In order to improve the tensile strength, the microstructure of polybutadiene is changed from the cis to the trans form. Further, the possibility of crystallization of polybutadiene is prevented by disturbing the regularity of trans polybutadiene by copolymerization with 1,3-pentadiene so as to prevent any rapid change in the modulus of elasticity in the piperylene which arises as a result of melting the crystals when the tire is in operation.

1,3-pentadiene is particularly useful because it is a monomer which can be easily obtained commercially in the form of the C5 fraction from crude oil and because its polymer has such a structure as to comprise methyl groups which do not directly bond to the carbon atoms of the double bonds. Hence, 1,3-pentadiene never lowers the flex resistance of the composition.

It is preferable that the butadiene-piperylene copolymer has a 1,3-pentadiene content between 15 to 50% by weight of the copolymer because it is impossible to sufficiently prevent the crystallization of trans-1,4-polybutadiene when the content of 1,3-pentadiene is less than 15% by weight. When crystallization is not prevented, the tire modulus of elasticity rapidly changes due to the melting of the crystal within the usual temperature range of tire operation (10° to 100° C.). This is not desirable because it becomes impossible to expect what the excellent flex resistance of polybutadiene is when the content of 1,3-pentadiene is more than 50% by weight.

The amount of carbon black to be used is preferably limited to 20 to 120 parts by weight because the modulus of elasticity and the tensile strength are not sufficient when the amount is less than 20 parts by weight and because the production operability for making the sidewalls is low and the flex resistance is greatly reduced when the amount exceeds 120 parts by weight.

The rebound resilience, measured at 30° C. with a Dunlop tripsometer, of the sidewall according to the present invention is preferably limited to not more than 50% because it is impossible to sufficiently improve the ride feeling when the resilience is higher than 50%.

Figure 1:
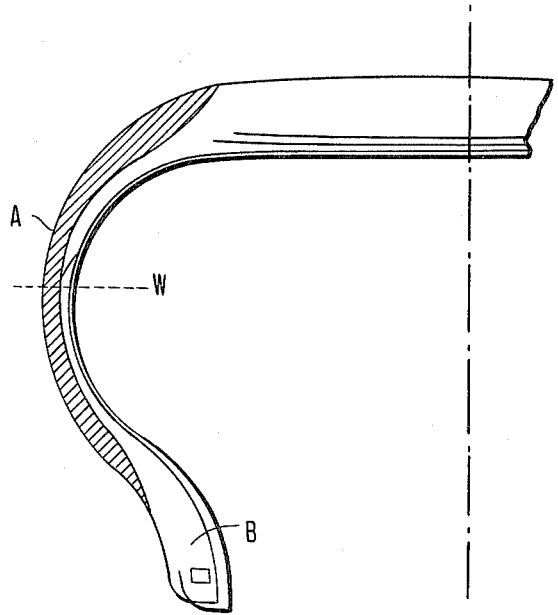
FIG. 1 shows sidewall A of a tire.
Figure 2:
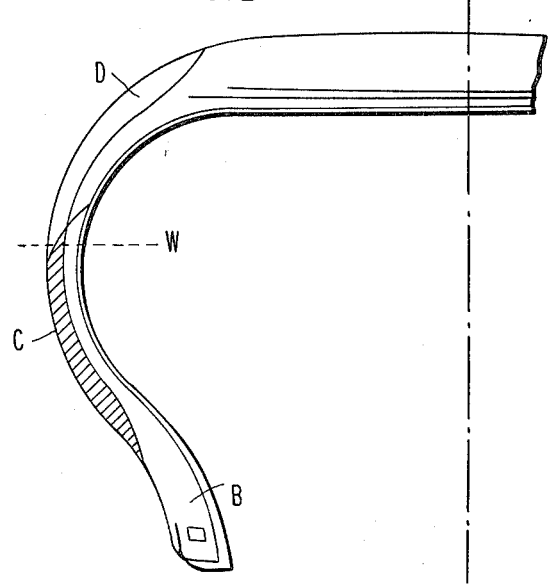
FIG. 2 shows portion C in the sidewall which is particularly suitable for the arrangement of the rubber composition according to the present invention. Portion C extends, as shown in FIG. 2, from the position of maximum tire width W in sidewall A to bead B.

The pneumatic radial tire of the present invention can improve the ride feeling when the vulcanizable rubber composition is arranged, as shown in FIG. 1, on sidewall A. The upper portion from the position of the maximum tire width W can greatly add to the rolling resistance of the tire, whereas the lower portion from the position of the maximum tire width W, i.e., the portion extending between the bead B and the position of maximum tire width W, can greatly add to the ride feeling performance. Thus, it is more desirable to provide a radial tire for low fuel consumption and excellent ride feeling by arranging the vulcanizable rubber composition according to the present invention all along part C, as shown in FIG. 2, extending from bead B to the position of maximum tire width W.

Since the vulcanizable rubber composition according to the present invention has (1) a markedly lower modulus of elasticity than that of any other similar composition of diene homopolymers and copolymers, (2) a flex resistance which is equal to or higher than that of cis-polybutadiene rubber even if the content of carbon black is increased, (3) a high tensile strength and (4) a high energy loss, it is highly suitable for obtaining a pneumatic radial tire with improved ride feeling performance.

The following non-limiting examples describe the invention in more detail.

EXAMPLES 1 TO 4

The butadiene-piperylene copolymer was prepared as follows:

In a 5 l flask equipped with a stirrer, a dropping funnel and a side cock (all of which were connected through ground connecting conical pipes), 1.3 l anhydrous toluene, 5 ml Al(C$_2$H$_5$)$_2$Cl, 1.365 g CCl$_3$COOH, 300 g 1,3-butadiene and 50 ml piperylene were added to prepare a solution. The composition of piperylene used was as follows:

trans-1,3-Pentadiene—62.6%
cis-1,3-Pentadiene—27.5%
Cyclopentene—8.66%
Cyclopentadiene—0.68%
Other C$_5$ isomers—0.56%

This solution was cooled to 3° C. and another solution containing 60 mg vanadium triacetyl acetonate in 10 ml of toluene was added to the former solution. The polymerization was activated by the further addition of 70 ml of piperylene. After three hours, the polymerization was stopped, the reaction product was coagulated by alcohol and then dried through a hot roll.

The product was analyzed using an infrared absorption spectrometer. The analysis showed that the copolymerized pentadiene unit corresponded to 35% of the total polymer weight and its viscosity $\eta$ was 233 dl/g in toluene at 30° C.

The butadiene-piperylene colpolymer thus obtained, hereinafter referred to as "sample", was mixed with natural rubber, carbon black, etc., in the proportions as shown in Table 1 below. The characteristics of each of the compositions are also shown in Table 1 below.

Note, the values in Tables 1, 3 and 4 are in parts by weight unless otherwise indicated.

TABLE 1

|  | Comparative Example 1 | Example 1 | Example 2 | Example 3 | Comparative Example 2 | Example 4 |
|---|---|---|---|---|---|---|
| Natural rubber | 85 | 80 | 50 | 10 | 5 | 35 |
| Sample | 15 | 20 | 50 | 90 | 95 | 50 |
| SBR 1500[1] | — | — | — | — | — | 15 |
| HAF[2] | 45 | 45 | 45 | 45 | 45 | 45 |
| Aromatic oil | 10 | 10 | 10 | 10 | 10 | 10 |
| Antioxidant IPPD[3] | 2 | 2 | 2 | 2 | 2 | 2 |
| Stearic acid | 2 | 2 | 2 | 2 | 2 | 2 |
| ZnO | 3 | 3 | 3 | 3 | 3 | 3 |
| Accelerator MBTS[4] | — | — | 0.2 | 0.2 | 0.2 | 0.2 |
| Accelerator OBS[5] | 0.7 | 0.7 | 0.6 | 0.7 | 0.7 | 0.7 |
| Sulfur | 1.5 | 1.5 | 1.5 | 1.5 | 1.5 | 1.5 |
| 100% modulus at 30° C. in kg/cm$^2$ | 16 | 16 | 14 | 13 | 13 | 14 |
| Rebound resilience at 30° C. | 50.3 | 48.6 | 47.3 | 41.2 | 40.6 | 45.8 |
| Flex resistance | 95 | 123 | 246 | 314 | 303 | 168 |
| Ride feeling | 3 | 4 | 5 | 5 | 5 | 5 |
| Cut resistance | 120 | 118 | 100 | 88 | 80 | 112 |

Note:
[1]SBR 1500 = Styrene-butadiene rubber 1500
[2]HAF = Phil Black N 330
[3]Antioxidant IPPD: Ozonone 3C manufactured by Seiko Kagaku Corp., corresponding to N—phenyl-N'—isopropyl-p-phenylenediamine.
[4]Accelerator MBTS: Nocceler DM manufactured by Ouchi Shinko Kagaku Industries, corresponding to dibenzothiazyldisulfide.
[5]Accelerator OBS: Nocceler MSA manufactured by Ouchi Shinko Kagaku, corresponding to N—oxydiethylene-2-benzothiazolesulfenamide.

Flex resistance was estimated from the following formula by determining the time elapsed until the initial crack appeared after flexing each sample without an initial incision, according to the flexing test, JIS K 6301:

$$\text{Flex resistance} = \frac{\text{Time elapsed until the initial crack appeared in the test sample}}{\text{Time elapsed until the initial crack appeared in the control sample}} \times 100$$

Ride feeling was estimated as follows: A vehicle with four test tires (size: 175 SR 14) was driven at the speed of 60 km/h over ten 10 mm diameter pipes arranged at regular intervals of 10 m. The noise and the vibrations produced by driving over the pipes were estimated and classified into five grades and averages. The larger the value the better the ride feeling.

Cut resistance was estimated as follows: An edge having an angle of 45° was shot at 8 cm thick vulcanized rubber composition blocks at a speed of 0.894 m/sec and an energy of 120 joules. The depth of the incision produced by the collision was then measured. An index of the cut resistance was calculated from the results according to the following formula:

$$\frac{38.5 \text{ (mm)}}{\text{Depth of the incision produced in the test sample (mm)}} \times 100$$

Index 100 corresponds to 38.5 mm which is equal to the depth of the incision in Example 2. The larger the index the better the cut resistance of the tire. The smallest index applicable to the tire sidewalls is 85.

The test data in Table 1 shows that the amount of the conjugated diolefin copolymer in the present invention is limited to 20 to 90 parts by weight.

EXAMPLES 5 TO 7

In a 5 l flask, equipped with a stirrer, a dropping funnel and a side cock (all of which were connected through ground connecting conical pipes), the following compounds were added as raw materials to prepare several solutions.

TABLE 2(a)

|  | A | B | C | D | E |
|---|---|---|---|---|---|
| Anhydrous toluene (l) | 1.3 | 1.3 | 1.3 | 1.3 | 1.3 |
| Al(C$_2$H$_5$)$_2$Cl (ml) | 5 | 5 | 5 | 5 | 5 |
| CCl$_3$COOH (g) | 1.365 | 1.365 | 1.365 | 1.365 | 1.365 |
| 1,3-Butadiene (g) | 300 | 300 | 300 | 300 | 300 |
| Piperylene (ml) | 50 | 50 | 50 | 80 | 100 |

Composition of piperylene used:
trans-1,3-Pentadiene—62.6%
cis-1,3-Pentadiene—27.5%
Cyclopentene—8.66%
Cyclopentadiene—0.68%
Other C$_5$ isomers—0.56%

Solutions A to E were cooled to 3° C. and another solution containing 60 mg vanadium triacetyl acetonate in 10 ml of toluene was added to the former solution. 0, 15, 70, 90 and 100 ml of piperylene was further added to these solutions, respectively. After three hours, each polymerization was stopped, the reaction product was coagulated by alcohol and then dried through a hot roll.

Each product was analyzed using an infrared absorption spectrometer. The analysis showed that the copolymerized pentadiene unit corresponded to the percentage of the total polymer weight and its viscosity value, as is shown in Table 2(b).

TABLE 2(b)

|  | A | B | C | D | E |
|---|---|---|---|---|---|
| Content in % by weight | 13 | 18 | 33 | 46 | 55 |
| Viscosity [$\eta$] in toluene at 30° C. | 1.83 | 2.01 | 2.33 | 1.68 | 2.51 |

The flex resistance values of the rubber compositions obtained by using these polymers are shown in Table 3.

TABLE 3

|  | Comparative Example 3 | Example 5 | Example 6 | Example 7 | Comparative Example 4 | Comparative Example 5 |
|---|---|---|---|---|---|---|
| Copolymer | | | | | | |
| Sample A | 50 | — | — | — | — | — |
| Sample B | — | 50 | — | — | — | — |
| Sample C | — | — | 50 | — | — | — |
| Sample D | — | — | — | 50 | — | — |
| Sample E | — | — | — | — | 50 | — |
| Polybutadiene (BR 01) | — | — | — | — | — | 50 |
| Natural rubber | 50 | 50 | 50 | 50 | 50 | 50 |
| Carbon black HAF | 50 | 50 | 50 | 50 | 50 | 50 |
| Aromatic oil | 10 | 10 | 10 | 10 | 10 | 10 |
| Antioxidant IPPD | 2.0 | 2.0 | 2.0 | 2.0 | 2.0 | 2.0 |
| Stearic acid | 2.0 | 2.0 | 2.0 | 2.0 | 2.0 | 2.0 |
| ZnO | 3.0 | 3.0 | 3.0 | 3.0 | 3.0 | 3.0 |
| Accelerator MBTS | 0.2 | 0.2 | 0.2 | 0.2 | 0.2 | 0.2 |
| Accelerator OBS | 0.6 | 0.6 | 0.6 | 0.6 | 0.6 | 0.6 |
| Sulfur | 1.5 | 1.5 | 1.5 | 1.5 | 1.5 | 1.5 |
| Flex resistance | 86 | 151 | 243 | 186 | 93 | 100 |

The data in Table 3 suggests that a preferable relative amount of 1,3-pentadiene contained in the butadiene-piperylene copolymers is 15 to 50% by weight.

EXAMPLES 8 AND 9

The data in Table 4 below shows that with the same flex resistance of the rubber compositions of the present invention (Examples 8 and 9) there is a larger energy loss than when other conventional rubber compositions are employed for sidewalls.

TABLE 4

|  | Example 8 | Example 9 | Comparative Example 6 | Comparative Example 7 | Comparative Example 8 | Comparative Example 9 | Comparative Example 10 |
|---|---|---|---|---|---|---|---|
| Natural rubber | 50 | 50 | 50 | 50 | 50 | 50 | 50 |
| Polybutadiene (BR 01) | — | — | 50 | 50 | 50 | 50 | 50 |
| Sample C | 50 | 50 | — | — | — | — | — |
| Carbon black FEF | 50 | 55 | 40 | 45 | 50 | 55 | 45 |
| Aromatic oil | 8 | 8 | 8 | 8 | 8 | 8 | 15 |
| Antioxidant IPPD | 2.0 | 2.0 | 2.0 | 2.0 | 2.0 | 2.0 | 2.0 |
| Stearic acid | 2.0 | 2.0 | 2.0 | 2.0 | 2.0 | 2.0 | 2.0 |
| ZnO | 3.0 | 3.0 | 3.0 | 3.0 | 3.0 | 3.0 | 3.0 |
| Accelerator MBTS | 0.2 | 0.2 | 0.2 | 0.2 | 0.2 | 0.2 | 0.2 |
| Accelerator OBS | 0.6 | 0.6 | 0.6 | 0.6 | 0.6 | 0.6 | 0.6 |
| Sulfur | 1.5 | 1.5 | 1.5 | 1.5 | 1.5 | 1.5 | 1.5 |
| 100% modulus at 30° C. in kg/cm$^2$ | 14 | 14.5 | 14 | 17 | 20 | 23.5 | 14.5 |
| Flex resistance | 253 | 221 | 185 | 136 | 108 | 71 | 119 |
| Weather resistance (Ozone cracking test) | B-1 | B-1 | C-2 | B-2 | B-1 | B-1 | C-4 |
| Rebound resilience at 30° C. | 47.6 | 45.2 | 56.5 | 53.2 | 50.6 | 48.2 | 49.8 |

TABLE 4-continued

| | Example 8 | Example 9 | Comparative Example 6 | Comparative Example 7 | Comparative Example 8 | Comparative Example 9 | Comparative Example 10 |
|---|---|---|---|---|---|---|---|
| Ride feeling | 5 | 5 | 3 | 2 | 1 | 2 | 4 |

Weather resistance was measured with a weathering test apparatus, Model OMS-R-2, manufactured by Suga Shikenki K.K., according to JIS K 6301.

Measuring conditions:
Duration—48 hr
Elongation—30% strain
Temperature—40° C.
Ozone concentration—50 pphm The state of the weather resistance was recorded on the basis of the characteristics shown in Table 5.

TABLE 5

Number of cracks
A: Small in number
B: Large in number
C: Innumerable in number
Size and Depth of cracks
1: Invisible to the naked eye but visible when using a 10X magnifying glass
2: Visible to the naked eye
3: Cracks are deep and relatively large (less than 1 mm)
4: Cracks are deep and large (from 1 mm to less than 3 mm)
5: Cracks are 3 mm or more

EXAMPLES 10 AND 11

In these examples, the rubber composition according to the present invention was applied to tire sidewalls to observe its effects.

In Example 10, the rubber composition according to Example 7 was applied to tire sidewall A as shown in FIG. 1 to prepare a 175 SR 14 tire.

In Example 11, the rubber composition according to Example 7 was applied to portion C between the position of maximum tire width and bead B, and according to Comparative Example 6 was applied to portion D above portion C to prepare a 175 SR 14 tire.

The results obtained are shown in Table 6 below.

TABLE 6

| | Example 10 | Example 11 |
|---|---|---|
| Portion C | Composition of Example 7 | Composition of Example 7 |
| Portion D | Composition of Example 7 | Composition of Comparative Example 6 |
| Rolling resistance | 100 (control) | 104.5 |
| Ride feeling | 5 | 5 |

Rolling resistance was measured under the following conditions: The test tire, subjected to an internal pressure of 1.7 kg/cm$^2$, was trained on a steel drum with a diameter of 1,707.6 mm and a width of 350 mm that was rotated by driving a motor at a speed of 80 km/hr under a JIS 100% load (385 kg) for 30 minutes. Thereafter, the rotating speed of the drum was raised to 100 km/hr. Then, the driving of the motor was stopped and the drum was allowed to run by inertia during which the rolling resistance of the tire to the drum at a speed of 50 km/hr was measured on a basis of the deceleration speed of the drum and the time change. Next, the net rolling resistance of the tire was determined by subtracting the previously calculated drum resistance from the measured value. Moreover, the rolling resistance of the test tire was evaluated by the following formula:

$$\frac{\text{Rolling resistance of control tire} - \text{Rolling resistance of test tire}}{\text{(Rolling resistance of control tire)}} \times 100,$$

wherein the rolling resistance of Example 10 was utilized as a control.

It can be seen from the results in Table 1, Table 4 and Table 6 that the pneumatic radial tire of the present invention yields an excellent ride feeling without lowering the flex resistance, cut resistance or weather resistance.

While the invention has been described in detail and with reference to specific embodiments thereof, it will be apparent to one skilled in the art that various changes and modifications can be made therein without departing from the spirit and scope thereof.

What is claimed is:

1. A pneumatic radial tire having sidewalls, the rubber composition of said sidewalls comprising, based on 100 parts by weight of rubber, 20 to 90 parts by weight of butadiene-piperylene copolymer and 80 to 10 parts by weight of at least one rubbery diene polymer selected from the group consisting of natural rubber, synthetic polyisoprene rubber, polybutadiene rubber, butadiene-styrene copolymer rubber, ethylene-propylene-diene ternary copolymer rubber and acrylonitrile-butadiene copolymer rubber, wherein said butadiene-piperylene copolymer has a 1,3-pentadiene content of 15 to 50% by weight of said butadiene-piperylene copolymer.

2. A pneumatic radial tire according to claim 1, wherein said butadiene-piperylene copolymer has a molecular weight between 150,000 and 500,000.

3. A pneumatic radial tire according to claim 1, wherein said rubber composition comprises 20 to 120 parts by weight of carbon black.

4. A pneumatic radial tire according to claim 1, wherein said sidewalls have a rebound resilience of not more than 50%.

5. A pneumatic radial tire according to claim 1, wherein said vulcanizable rubber composition is arranged all along the portion extending from the bead to the position of maximum tire width on said sidewall.

* * * * *